Jan. 14, 1941.   J. H. L. DE BATS   2,228,871
DIAMOND BEARING TOOL AND PROCESS OF MAKING SAME
Filed March 14, 1939   2 Sheets-Sheet 1
Fig. 1.
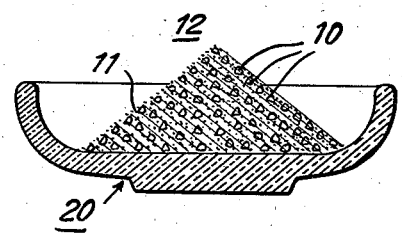
Fig. 2.      Fig. 3.
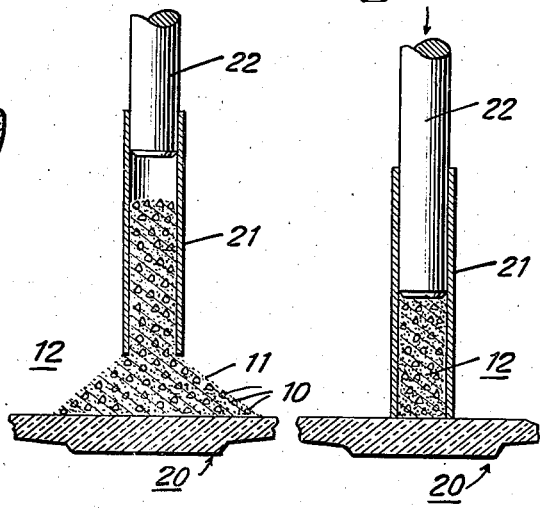
Fig. 4.
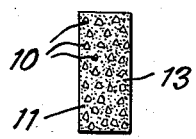
Fig. 5.      Fig. 6.
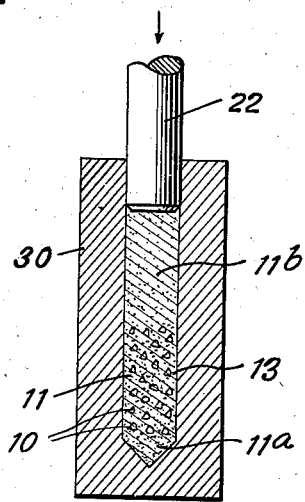
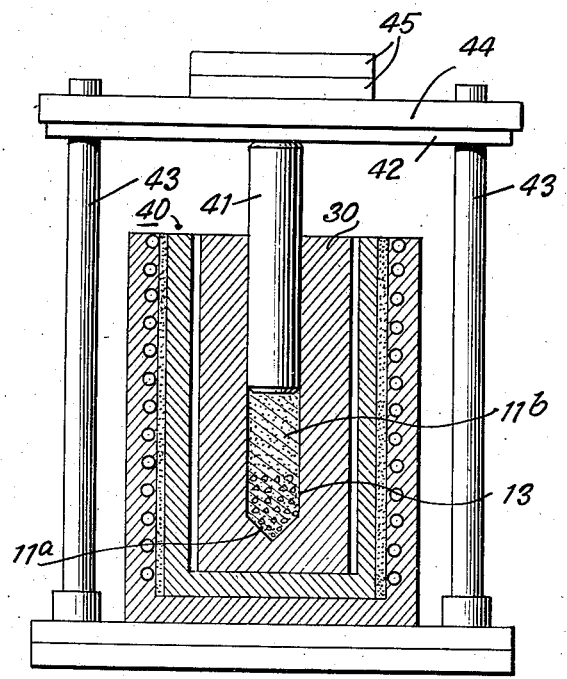
Fig. 7.
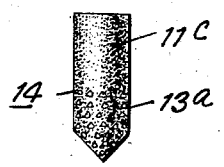
INVENTOR
Jean Hubert Louis DeBats
BY
Emery, Varney, Whittemore & Dix
ATTORNEYS Patented Jan. 14, 1941

2,228,871

UNITED STATES PATENT OFFICE 2,228,871

DIAMOND BEARING TOOL AND PROCESS OF MAKING SAME

Jean Hubert Louis De Bats, East Orange, N. J., assignor to Metal Carbides Corporation, Youngstown, Ohio, a corporation of New Jersey Application March 14, 1939, Serial No. 261,702

3 Claims. (Cl. 51—309)

This invention relates to improved methods of mounting industrial diamonds in tools and to the improved tools so produced.

Hitherto, in the manufacture of industrial diamond tools, such as core drills and wheel-dressing devices, relatively soft metal has been required to be used, the diamonds being held in place by peening soft metal therearound. The setting of diamonds is a highly skilled trade and the costs are quite appreciable. A great disadvantage in such set diamonds has arisen from the presence of the relatively soft holding or binding metal. Such soft metal is found to give way during use, with the result that diamonds are knocked loose and destroy the tools. Where a dressing or grinding tool was made of one or two carats of diamonds, or even two or three carats, comprising a dozen or a dozen and a half separate stones, the whole mass was segregated or concentrated at the working end of the tool and over the entire diameter thereof, the remainder of the tool being free of diamonds and adapted for insertion into a tool holder. Where diamonds are massed together in this manner an insufficient amount of bonding metal occurs between the several stones or fragments of stone so that they are all soon ripped or torn out of place.

It has now been found that industrial diamonds may be rapidly and accurately mounted in any desired grouping and number, while assuring and maintaining a desired, positive gripping and holding of the stone or stones in place until they are worn out through proper use.

It is a feature of the present invention to provide improved processes for mounting industrial diamonds.

It is also a feature of the present invention to provide such a process in which particulate diamonds are intermingled and intermeshed with refractory powdered binding metals and the whole formed into suitable-shaped tools or tool members.

Another feature of the present invention is the provision of improved diamondiferous tools containing aligned diamonds wetted by and gripped in coalesced or cast metallic embedments, preferably of refractory and/or highly heat-conducting metals, with or without the inclusion of heat-removing members.

A further feature of this invention resides in an improved method of bonding diamonds in tools wherein the diamonds are caused to be "wetted" by the refractory or other binding metal and permanently bonded and gripped therein.

An additional feature of novelty in the present invention is the provision of improved apparatus for mounting industrial diamonds.

These, and other desirable objects and advantages of the present invention will be described in the accompanying specification, certain specific examples being illustrated by way of example only, for, since the underlying principles may be applied to the formation of other specific articles, it is not intended to be limited to the ones here shown, except as such limitations are clearly imposed by the appended claims.

In the drawings like numerals refer to similar parts throughout the several views, of which Fig. 1 is a view, partly in section, and partly in elevation, of an initial mix of particulate diamonds and powdered binding metal;

Fig. 2 is a fragmentary view, partly in section, of the method of assembling the mixed diamond particles and binder;

Fig. 3 is a view similar to Fig. 2, showing the initial compression of the materials to form a coherent slug;

Fig. 4 is an elevation of a slug as produced in the apparatus of Figs. 2 and 3;

Fig. 5 is a view, in vertical section, of a mold showing the slug of Fig. 4 in place supported top and bottom with added binder metal;

Fig. 6 is a section through an induction furnace showing the crucible of Fig. 5 in place and the contained material acted on by a weighted plunger;

Fig. 7 shows a coalesced tool member as formed in the apparatus of Fig. 6;

Figure 8:
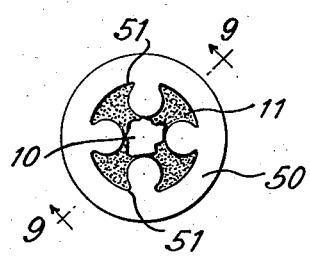
Figs. 8 and 9 are horizontal cross-sections and Figs. 10 and 11 are vertical cross-sections of improved devices for setting diamonds in aligned relation.
Figure 10:
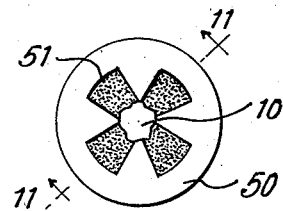

Referring now to the drawings, particulate diamonds 10 of suitable size, usually ranging in number from 12 to 18 per carat, more or less, are mixed with a suitable amount of a binder metal 11, preferably in powdered form. This mix may be made in any suitable container or dish 20, and the mix wetted with water or other appropriate menstruum to permit coalescence of the materials. When this stage has been reached the material is ready for further treatment and for the purpose of clearness is now designated generally by the numeral 12. The diamondiferous material 12 is packed into an ordinary brass tube or the like 21, of suitable diameter and tamped in place by means of plunger 22 to form a slug 13. This slug, it will be observed, contains the several diamond particles, of appreciable size, and preferably of a size much larger than that known in the trade as "dust," which particles are uniformly distributed throughout the body thereof, and surrounded and wetted by the binder material 11. The slug 13 is introduced into a mold cavity of a graphite or other crucible member 30. This crucible is provided with an initial filling or priming 11a of binder material, and on top of the slug 13 a second filling 11b of binder material is made in sufficient quantity to provide a tool shank of desired size. These materials are tamped in place in the usual manner by the tamper or plunger 22.

The crucible 30 with its contained materials is introduced into an electric furnace, preferably of the induction type and designated generally by the numeral 40. A plunger 41 of a diameter equal to the chamber diameter of the crucible, is fitted therein, and this plunger may be controlled by a yoke device comprising plate 42, with rods 43 adapted to work against compression plates 44, 45, so as to maintain the plunger 41 under positive pressure at all times. The amount of the pressure applied may be controlled by piling weights 45 on members 44. When a current is applied to the furnace the binder material will soften or fuse, depending on the temperature used, and the plunger 41 will force the same into intimate contact in and about and through the diamond particles 10 of the slug 13. The resulting product is a thoroughly bonded diamondiferous mass, indicated generally as 13a in Fig. 7, surmounted by an integral compressed coalesced mass 11c, which provides a shank or holder for the new element, now designated generally by the numeral 14.

The binder materials may comprise any well-known metals such as iron, steel, cobalt, nickel silver, copper, silver-copper alloys, or any metals having a suitable degree of toughness and strength. In addition, refractory metals such as tungsten, alloyed, or not, with cobalt; molybdenum, vanadium, and other tough refractory metals may also be used. Where the binder material is desired to be distinctly refractory and abrasive, as well as having great toughness and strength, tungsten carbide-base alloys may be made use of. A preferred composition for such purposes may contain about 50% tungsten carbide and the balance of a carbon-free alloy of tungsten and cobalt. The cobalt is present in amounts sufficient only to prevent attack of the carbon-free tungsten metal by the carbon of the tungsten carbide. Cobalt, from .5% and up, has been found sufficient for this purpose, depending upon the amount of tungsten carbide present in the finished product.

To further improve the method of wetting and bonding diamonds with various metals and also to increase the speed of forming tool parts, the novel feature now to be described has been found of great assistance. If a group of diamonds in particulate form, are intimately mixed with graphite powder, lamp black, sugar carbon, carbon black, and like carbonaceous materials and heated out of contact with air to a temperature of about 1500° C. and for a time period of from 3 minutes to 10 minutes, depending upon the particle size of the diamonds, it is found that the diamonds acquire a black surfacing. The nature of this surfacing, or the reaction by which it adheres on the surfaces of the diamonds, is not at present known. Such carbon-treated diamonds when mixed with the metals and alloy compositions herein described, are found to have a better wetting or gripping effect on the diamonds embedded therein, or vice versa. These improved results, as noted above, permit the use of very small diamond particles with a wide variety of metals and in a wide variety of shapes and forms for various industrial purposes. Due to this unexpected wetting or adherent power or capacity imparted to the diamonds by the carbon treatment above described, other metals or alloys, such as silver solder, Tobin bronze, and the like, may be used as binding metals for the diamonds either in aligned form or as diamond aggregates.

Figure 16:
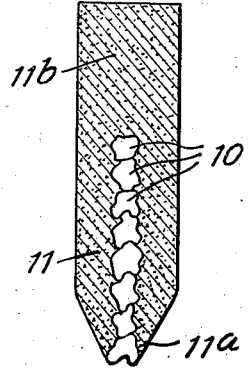
Fig. 16 is a vertical section of a tool prepared according to the method shown in Figs. 8 to 15, in which the diamonds are mounted in direct alignment.
Figure 13:
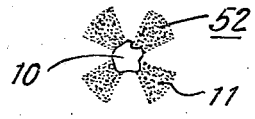
Figure 14:
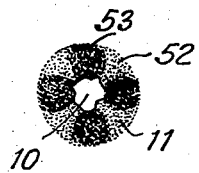
Figure 15:
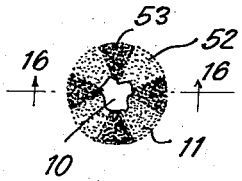

In Figs. 8 to 15 there have been disclosed a variety of methods and devices suitable for forming diamond tools in which the diamonds, instead of being uniformly dispersed throughout the working end of the tool, are presented in a true, straight, axial alignment as shown in Fig. 16.

Figure 9:
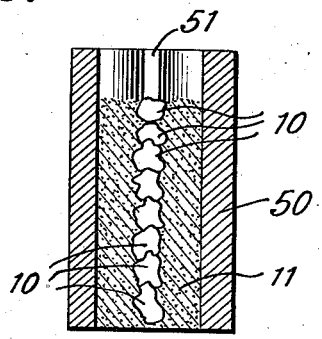
Figure 11:
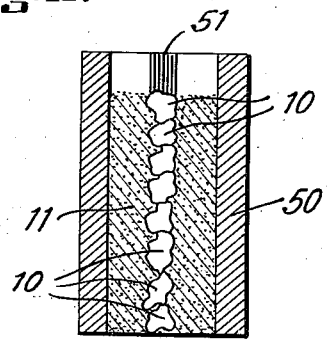
Figure 12:
Figs. 12, 13, 14 and 15 are horizontal cross-sections of modifications of intermediate and completed devices for holding diamonds in aligned relation.

In Figs. 8 and 9 a graphite or other tube 50 is provided with a series of internal flutes or channels 51 converging to form a central longitudinal chamber of sufficient diameter to receive and hold abutted diamonds 10 in alignment. These tubes may be placed in a suitable device such as a furnace or press, and after powdered metal has been tamped in place, are then heated to coalesce the metal. These members may also be inserted in a centrifugal machine and the binder metal 11, either in liquid or powdered form, cast therein and therearound in the usual manner. If powdered metal is used, it is coalesced by a subsequent or simultaneous heating. The casing or crucible may be broken away, leaving a structure having a general cruciform cross-sectional shape as shown at 52 in Fig. 12. This member may be inserted in a casing or the like, or have supporting rods or fillets 53 of tungsten, or the like, cast in position to serve as lateral and longitudinal supports for the tool parts. Where high heat removal, as well as support is desired, the fillets 53 may be made of copper, silver, copper-silver alloys, nickel and its alloys, and other heat-conducting metals and alloys.

The construction shown in Figs. 10, 11, 13 and 15 is similar to those just described, the configuration of the parts being varied, if desired. The finished tool member as shown in Fig. 16 comprises a series of aligned diamonds 10 mounted in a cast or coalesced binder material 11, the diamonds being so arranged that when the forward or leading diamond wears out the succeeding diamonds are successively presents for use.

From the foregoing it will be noted that the tungsten carbide called for in the composition is composed of substantially pure tungsten and carbon and that there is added a carbon-free tungsten metal alloy, preferably composed of tungsten and cobalt, as the additional amount of the holder composition. The tungsten of the tungsten-cobalt alloy, it will be noted, is lacking in carbon as pointed out above. The presence of the cobalt does not always prevent the carbon-free tungsten from robbing carbon from any place possible so as to satisfy the affinity of tungsten for carbon. In the treatment at high temperatures, as indicated around 1700 degrees C., some of the cobalt will vaporize and will leave this carbon-free tungsten in such a state that it will pick up carbon wherever possible, and in the event some carbon issues from the diamonds, the tungsten will combine with that carbon and form a coating or shell of fused tungsten carbide around the diamond. The material between the diamonds will be a combination of tungsten carbide, and tungsten and cobalt, which will be less wear-resistant than the metal in contact with diamonds.

It will now be appreciated that there have been provided improved methods and apparatus for preparing diamond-bearing tools of different kinds, in which the diamonds are wetted and held in a wide variety of binder metals or materials both in strict alignment, as well as dispersed therethrough. In addition, the improved tools or tool members so produced are adapted for a wide variety of uses, and due to their simple structure, approximating a pencil in general contour and shape, they are adapted to be generally inserted in a wide variety of tools such as dressing tools, core drills and the like, without requiring special apparatus and highly skilled personnel for making installations, replacements and repairs. Due to the use of metals and alloys of high heat conductivity, either as bonding embedments or associated fillets of diamondiferous tool elements, the heats generated by friction of the diamonds against surfaces being worked are rapidly removed from and by the embedding metal. This rapid heat removal from the working surfaces of diamondiferous tool members or elements prevents the building up of heats supplied to cause softening of the embedding metals or alloys, with accompanying disruption and tearing out of the embedded diamonds.

The terms and expressions which have been employed herein are used as terms of description and not of limitation, and there is no intention, in the use of such terms and expressions, of excluding any equivalents of the features shown and described, or portions thereof, but it is recognized that various modifications are possible within the scope of the invention claimed.

I claim:

1. The method of forming a diamond-embedded metallic composition which consists in forming a fine powder of approximately 50 per cent. of tungsten carbide, and the remainder tungsten metal and from .5 per cent. of cobalt to a sufficient amount to prevent attack on said tungsten metal by the carbon of the tungsten carbide, positioning a desired quantity of diamonds in spaced relation in the tungsten carbide, tungsten metal and cobalt, then subjecting this assembly to a temperature approximating 1700 degrees C., and applying high pressure to said metallic composition while at the high temperature to eliminate substantially all gases and to prevent voids.

2. A diamond-embedded abrading tool comprising diamonds, and a body formed of tungsten carbide, tungsten metal substantially carbon-free and cobalt sufficient to prevent attack on the tungsten metal by the carbon of the tungsten carbide, said diamonds being interspersed therein in appreciably spaced relation one from the other.

3. A diamond-embedded abrading tool comprising diamonds and a body composed of tungsten carbide amounting to approximately 50 per cent. of said body, and the balance of carbon-free tungsten metal and cobalt, said cobalt ranging from .5 per cent. to an amount to prevent attack on the tungsten metal by the carbon of the tungsten carbide, said diamonds being held apart by said body composed of the tungsten carbide, tungsten metal, and remaining cobalt.

JEAN HUBERT LOUIS DE BATS.